(12) United States Patent
Zauderer

(10) Patent No.: US 8,388,918 B2
(45) Date of Patent: Mar. 5, 2013

(54) PHYSICAL SEPARATION AND SEQUESTRATION OF CARBON DIOXIDE FROM THE EXHAUST GASES OF FOSSIL FUEL COMBUSTION

(76) Inventor: Bert Zauderer, Merion Station, PA (US)

( * ) Notice: Subject to any disclaimer, the term of this patent is extended or adjusted under 35 U.S.C. 154(b) by 0 days.

(21) Appl. No.: 13/158,932

(22) Filed: Jun. 13, 2011

(65) Prior Publication Data

US 2012/0058042 A1    Mar. 8, 2012

Related U.S. Application Data

(60) Provisional application No. 61/380,913, filed on Sep. 8, 2010.

(51) Int. Cl.
- *B01D 53/62* (2006.01)
- *B01D 53/56* (2006.01)
- *B01D 53/50* (2006.01)
- *B01D 53/68* (2006.01)
- *B01D 53/72* (2006.01)
- *B01D 53/38* (2006.01)
- *B01D 53/73* (2006.01)
- *B01D 53/78* (2006.01)

(52) U.S. Cl. ............ 423/220; 423/215.5; 423/235; 423/240 R; 423/242.1; 423/245.1; 423/245.3; 423/430; 423/437.1

(58) Field of Classification Search ............ 423/215.5, 423/220, 230, 235, 240 R, 242.1, 245.1, 245.3, 423/432, 437.1, 430
See application file for complete search history.

(56) References Cited

U.S. PATENT DOCUMENTS

| | | | |
|---|---|---|---|
| 4,624,191 | A | 11/1986 | Zauderer et al. |
| 4,765,258 | A | 8/1988 | Zauderer |
| 6,048,510 | A | 4/2000 | Zauderer |
| 6,453,830 | B1 | 9/2002 | Zauderer |
| 6,722,295 | B2 | 4/2004 | Zauderer |
| 7,247,285 | B2 | 7/2007 | Zauderer |
| 7,282,189 | B2 | 10/2007 | Zauderer |
| 7,435,400 | B2 | 10/2008 | Zauderer |
| 7,553,463 | B2 | 6/2009 | Zauderer |

*Primary Examiner* — Daniel C McCracken
*Assistant Examiner* — Daniel Berns
(74) *Attorney, Agent, or Firm* — Andrew M. Calderon; Roberts Mlotkowski Safran & Cole, P.C.

(57) ABSTRACT

Methods are provided for physically removing all the carbon dioxide from the combustion products of solid, liquid, and gaseous fossil fuels. The combustors operate without excess air to maximize the carbon dioxide at the exhaust, which is compressed with the nitrogen and mixed with pressurized water to dissolve the carbon dioxide in a chamber from which the nitrogen gas is removed. The solution is drained into a second lower pressure chamber from which the carbon dioxide re-evolves as a gas, which is then pressurized for sequestration in limestone formations as calcium bicarbonate. The water is recycled to repeat the separation process, and depressurization of the two gases recovers most of the compression energy.

11 Claims, 1 Drawing Sheet

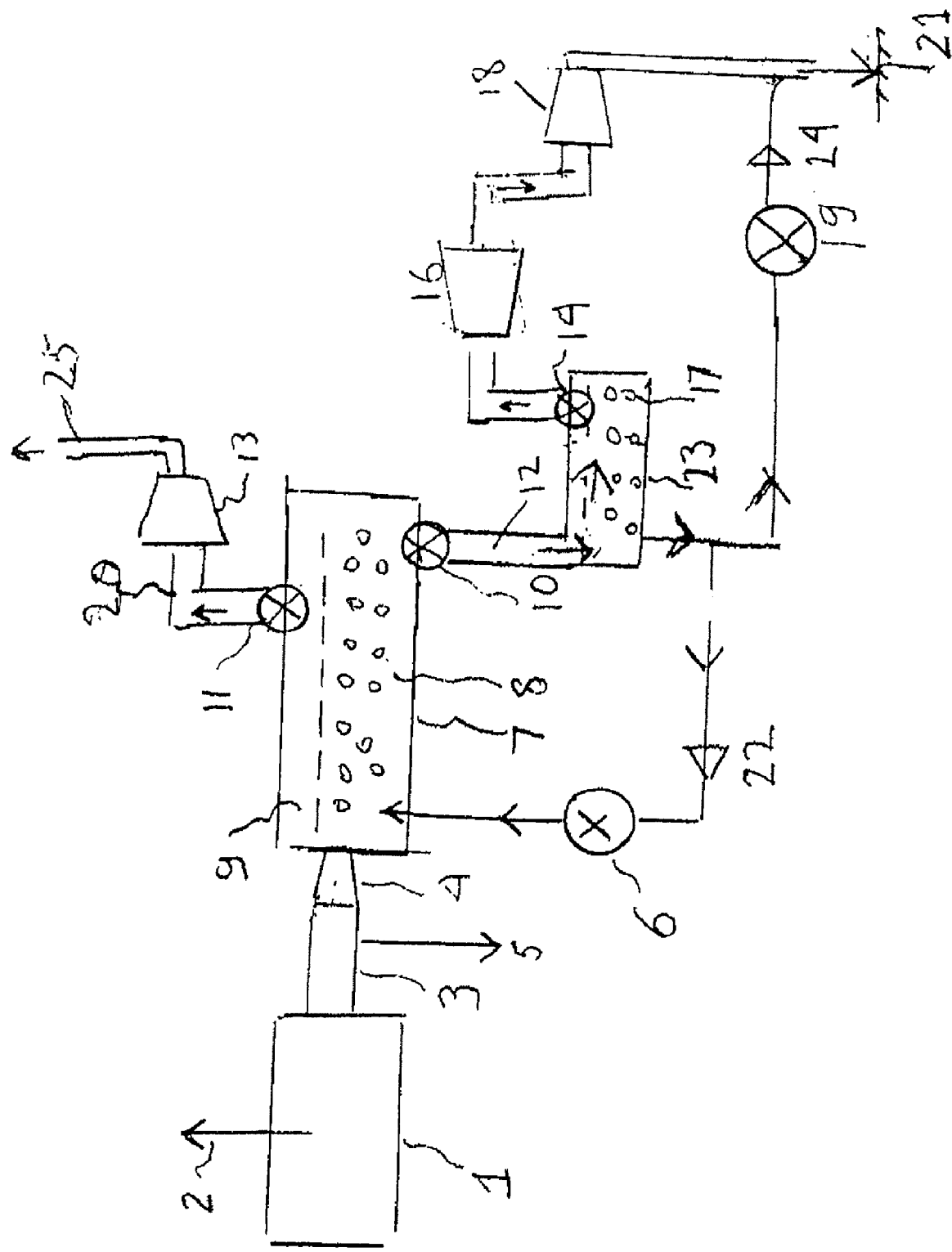

PHYSICAL SEPARATION AND SEQUESTRATION OF CARBON DIOXIDE FROM THE EXHAUST GASES OF FOSSIL FUEL COMBUSTION

CROSS REFERENCE TO RELATED APPLICATIONS

The present application is a non-provisional application of U.S. Application Ser. No. 61/380,913, filed on Sep. 8, 2010, the contents of which are incorporated by reference herein in their entirety.

BACKGROUND OF THE INVENTION

1. Field of the Invention

The present invention relates to methods for removing and sequestering carbon dioxide ($CO_2$) from coal fired boilers and furnaces.

2. Description of Related Art

Bert Zauderer in U.S. Pat. No. 7,282,189, disclosed processes and methods whereby carbon dioxide ($CO_2$) in the exhaust from the combustion in air of carbon in coal is physically separated from nitrogen ($N_2$). Said separation is implemented by pressurizing the $CO_2$ and $N_2$ gas mixture with water all at the same pressure and in sufficient water quantity to dissolve the $CO_2$ in the water. This is followed by exhaust of the $N_2$, which is approximately 60 times less soluble in water and remains in the gas phase. The pressurized $N_2$ expands in gas turbines in order to recover about 90% of the $N_2$ compression power.

Said patent contains in column 15 lines 45 to 67 and column 16 lines 1 to 5 numerical examples on how to practices this separation. Specifically, compression of $CO_2$ and $N_2$ to 10 atmospheres (147 psi) reduces the amount of water needed to dissolve the $CO_2$ by Henry's Law by a factor of 10 less than necessary to dissolve $CO_2$ at atmospheric pressure. At ambient gas and water temperatures, 67 pounds of water per pound of gaseous $CO_2$ are required compared to 670 pounds of water per pound of $CO_2$ at atmospheric pressure. The $N_2$ is then released from the mixing pressure vessel and expanded in a gas turbine to recover about 90% of the $N_2$ compression power.

Column 17, lines 1 to 40, in said patent teaches further compression of the water-$CO_2$ solution, which contains a small fraction of carbonic acid, to 1000 psi. This pressure equals that at 2150 feet below the surface, where injection of the carbonic acid solution into natural limestone geologic formations will form a calcium bi-carbonate solution that will permanently sequester the $CO_2$. Column 16 lines 22 to 54 teach how this sequestration is implemented in a two-step process consisting of compression of $CO_2$, $N_2$ and water from atmospheric pressure at ambient temperatures to 147 psi. This is followed in step 2 by removal of the $N_2$ and compression of the remaining $CO_2$-water solution to 1000 psi for sequestration of the $CO_2$ in limestone formations. Since this two step process consumes 25% of the power plants power output, another example in column 17, lines 1 to 40, teaches a one step process of compression from 14.7 psi to 1000 psi. This reduces the total sequestration power to 14% of the power plant's power output. In both the two-step and one step processes, a substantial amount of the power plant's output is derived from expanding the pressurized $N_2$ to atmospheric pressure.

In either example in said Zauderer patent, the $CO_2$ sequestration process is more efficient and far less costly than the U.S. Department of Energy's multi-billion dollar $CO_2$ Sequestration Program that uses chemical separation, primarily with amines or ammonia, to separate the $CO_2$ from the $N_2$. The process consumes 26% of a plant's power output with one half of that sum consumed in the chemical separation step. One reason for using the chemical separation process is that the mol fraction by volume of $CO_2$ in all coal power plants is 10% to 12% of the exhaust gases. In contrast, said Zauderer patent teaches that when only solid carbon is used as the fuel that is obtained from devolatilized coal char, or unburned carbon in coal ash, or anthracite culm, the $CO_2$ in the exhaust is about 20% by volume. In addition, Zauderer's patent teaches combustion at a stoichiometric ratio of unity, namely with no excess air, which is possibly by firing said fuels in a refractory lined wall in an air-cooled slagging coal combustor, as per Zauderer's U.S. Pat. No. 4,624,191, which by reference is incorporated herein. In addition, the pollutants from coal combustion must be removed upstream of the $CO_2$ separation and sequestration steps to prevent said pollutants from depositing in the sequestered underground $CO_2$. Processes to accomplish the pollutant removals are disclosed in Zauderer's U.S. Pat. Nos. 7,553,463, 7,435,400, 7,282,189, 7,247,285, 6,722,295, 6,453,830, 6,048,510, and 4,765,258, which by reference are incorporated herein.

A major concern in the art of $CO_2$ sequestration is the high cost of the process. While Zauderer's two U.S. patents on $CO_2$ removal (U.S. Pat. No. 7,553,463 and U.S. Pat. No. 7,282,189) disclosed lower costs than all others disclosed in the prior art, further reduction are still possible to improve overall power output, reduce capital investment, and reduce operating costs. One low cost solution disclosed by Zauderer in U.S. Provisional Application No. 61/293,841, filed Jan. 11, 2010, which by reference is incorporated herein, is to incorporate $CO_2$ separation with offsets, namely co-production of electricity with production of cementitious slag in the air-cooled slagging combustor that is converted from high ash char, or anthracite culm, or ash mixed with unburned carbon, and revenue from the sale of $CO_2$ credits from sequestered $CO_2$ from combustion and $CO_2$ credits from avoided $CO_2$ from Portland cement kilns that are replaced by cementitious slag. The potential revenue from these three products can be several times the revenue from electricity sales alone, which would far exceed the cost of $CO_2$ separation and sequestration.

In the period from about June 2009 to date, the U.S. Department of Energy (DOE) awarded almost $2 billion dollars in R&D and Demonstration contracts that will be matched by over 50% from the private sector, to implement $CO_2$ separation and sequestration contracts over most of this decade. Zauderer's January 2010 Provisional Application No. 61/293,841 stated that almost all the DOE awards were for variations of the costly, inefficient $CO_2$ chemical separation processes. Also reported therein was a response to DOE's rejection within several weeks after receipt of Zauderer's August 2009 proposal for a 25 MW power plant demonstration to implement Zauderer's $CO_2$ separation and sequestration processes, as disclosed in said Provisional application and U.S. Pat. No. 7,282,189. Despite meeting all the DOE solicitation requirements and offering to implement the demonstration plant at a very small fraction of the cost of the other awards, DOE rejected the proposal without a critical reviewer, as discussed in said Provisional application. Since January 2010 DOE has made scores of other $CO_2$ awards, all of which are for chemical separation, except for a surprising $1 billion award in August 2010 in which DOE reversed its earlier decision to support the zero emission, with $CO_2$ sequestration, coal gasification, combined gas turbine/steam turbine plant in Illinois, named Future Gen No. 1. It has been under study since 2003 by an international industry-government consortium. DOE cancelled the project in 2006 due to major cost overrun projections, but it was reinstated in 2008 by the current Administration. Then in August 2010 without an apparent new pre-announcement or competitive solicitation, DOE canceled the Future Gen 1 Project and replaced it with an equally rated 200+MW plant with zero emissions and with $CO_2$ sequestration to be fired with oxygen, which removes the need for $CO_2$ separation from $N_2$ in the combustion gas exhaust. The DOE news release stated that a new $O_2$ separation process based on an undisclosed membrane separation process offered by the American arm of Air Liquide, licensed to Babcock-Wilcox will be used. Zauderer in said U.S. Pat. No. 7,282,189, Column 16, lines 6 to 21 compares using pure $O_2$ to burn coal compared to the $CO_2$ process in said invention and states that removing the $N_2$ would consume 2 MW, which is 20 times less than a standard $O_2$ production system. The DOE press release asserts that the Air Liquide $O_2$ process will not reduce the plant efficiency. However, intuitively a membrane separation process should cost much more that a particle baghouse, which costs about $100/kW. Also if the process is so cheap why is DOE committing $1 billion for a 200 MW power plant retrofit of which B&W will apparently receive $200 million for the $O_2$ process.

SUMMARY OF THE INVENTION

This invention relates to methods for increasing efficiencies and reducing costs of $CO_2$ separation and sequestration beyond those disclosed in prior art. Specifically:

This invention discloses new methods for physically removing all the carbon dioxide from the combustion products of solid, liquid, and gaseous fossil fuels in energy systems, primarily electric power plants that contain components, including one or more of furnaces, boilers, gas turbines, and heat engines.

The $CO_2$ removal is implemented by operating fossil fuel fired combustors in said energy systems at a stoichiometric ratio of unity, which eliminates all excess oxygen and maximizes the carbon dioxide in the products of combustion, which facilitates the separation of carbon dioxide from the nitrogen in the combustion gas exhaust.

The removal of excess oxygen requires closing all wall openings in coal, oil, or gas fired boilers to eliminate significant air infiltration. Also, for combustion in gas turbines, blade cooling is to be implement with carbon dioxide, instead of air, which dilutes the $CO_2$ in the gas exhaust and decreases the efficiency and increases the cost of $CO_2$ separation.

Also, if the fuel is coal, prior to $CO_2$ separation, pollutants consisting of nitrogen oxides, sulfur dioxides, hydrogen chlorides, dioxins, furans and volatile trace metals are removed in the combustion and post combustion zone, preferably with air-cooled slagging combustors in the combustion zone, or with other pollutant removal methods.

This is followed by cooling the exhaust gases consisting of carbon dioxide, nitrogen, and water vapor, to ambient air pressure and temperature in order to condense the water vapor.

This is followed by compressing the carbon dioxide, nitrogen, with water to dissolve all the carbon dioxide to a pressure whose compression power consumes a small fraction of the total plant power, with said gas and water compression preferably provided by compressors and pumps driven by excess steam turbine capacity not used to drive the plant's electric generators.

This is followed by said compressed carbon dioxide, nitrogen, and water being injected into a mixing chamber or horizontal pipe whose height is selected to enable the insoluble nitrogen gas bubbles to float to the top of said mixing chamber or horizontal pipe whose volume is large enough to retain a constant pressure in said mixing chamber while the nitrogen gas at the top of said pipe or chamber is removed through one or more one-way valves in order to drive gas turbines that recover almost all of the nitrogen compression power.

Simultaneously the pressurized carbon dioxide-water solution is drained from the lower part of the mixing chamber through one or more one-way valves into a lower chamber or pipe at the same rate as the nitrogen is removed at the top of the mixing chamber.

The pressure in the lower chamber is reduced in order to re-evolve the carbon dioxide from the solution as gas bubbles that are directed through gas turbines to recover most of the carbon dioxide compression power which reduces the gas pressure to atmospheric.

The carbon dioxide is then re-pressurized to a pressure sufficient to inject into about 2150 feet deep geologic limestone formations with sufficient water to form carbonic acid that will react to form calcium bicarbonate that permanently sequesters the carbon dioxide.

Simultaneously the water is recovered from the lower chamber, reused by re-pressurization in order to repeat the carbon dioxide removal process with new carbon dioxide and nitrogen fossil fuel combustion products, which enables and/or results in continued use of much of the water and eliminates or reduces the risk of said water becoming contaminated from leached underground hazardous materials, such as hazardous trace metals and other underground contaminants.

BRIEF DESCRIPTION OF THE DRAWING

The present invention is described in the detailed description which follows, in reference to the noted plurality of drawings by way of non-limiting examples of exemplary embodiments of the present invention.

The FIGURE is a schematic line diagram that shows how to implement the carbon dioxide separation process from the products of combustion of fossil fuels followed by its permanent sequestration preferably in underground limestone formations.

DETAILED DESCRIPTION OF THE INVENTION

The following narrative fully describes how to practice this invention. Therefore, the details in the schematic in the FIGURE are presented as a summary at the end of this Section The present invention discloses a totally novel method whereby carbon dioxide can be physically separated from nitrogen in a combustion gas exhaust in a manner that facilitates permanent carbon dioxide sequestration in underground limestone formations. This method is far less costly and requires much less power than chemical separation. It is also less costly and more efficient than using oxygen combustion. Furthermore, the new method discloses further improvements over the prior art in U.S. Pat. No. 7,282,189 where the present Inventor, Zauderer, disclosed methods by which $CO_2$ can be separated from nitrogen and sequestered. That patent was for coal, while the present invention can be practiced with all fossil fuels. These prior methods as well as the present one depend on using the much lower solubility of nitrogen at ambient temperatures, which is about 60 times lower than carbon dioxide in water at the same pressure and temperature, to separate the carbon dioxide. One example in said prior patent (column 15, lines 35 to 64) discloses compressing $CO_2$, $N_2$, and water to 10 atmosphere, dissolving the $CO_2$ in water and then exhausting the $N_2$ which remains in the gaseous state. This is followed (column 16, lines 22 to 54) by compressing the entire $CO_2$-water solution to 1000 psi to a state where the carbonic acid in the solution, which is a very small fraction of the $CO_2$ in the solution, will dissolve limestone in geologic formations to form calcium bi-carbonate, which sequesters the $CO_2$. This method consumes 55 MWe, or 25%, of the 221 MWe electric generated.

The second example (column 17, lines 7 to 26) teaches implementing the entire process in one step, namely compressing the $CO_2$—$N_2$-water mixture from atmospheric pressure of 14.7 psi to 1000 psi. This reduces the total internal power consumption for compression, separation and sequestration to 31 MWe, which is 14% of the total 221 MWe power plant output, compared to 25% in the two-step method.

Said Zauderer patent does not disclose the time needed to separate the $N_2$ from the $CO_2$-water solution, a value that impacts the size of the separation vessel and the efficiency of the separation process.

Also, said patent does not disclose another option of separating the $CO_2$ as a gas from the water solution at an intermediate compression, such as the 10 atm. (147 psi) pressure, followed by only compressing the $CO_2$ to 1000 psi. This eliminates the need to compress the water in the $CO_2$-water mixture to 1000 psi, which requires substantial power. Also, by removing the $CO_2$ as a gas from the water prior to $CO_2$ injection for permanent geologic sequestration, the water can be continuously recycled to separate new $CO_2$ from $N_2$, which saves massive amounts of water that does not need to be pumped into the underground limestone geologic formation. This benefits regions that have limited water, such as the U.S. Southwest. It also benefits the other regions of the U.S because it eliminates the risk of contamination of the water in the $CO_2$-water solution that contains carbonic acid from leaching of underground hazardous metals. These metals will remain in the water after the carbonic acid in the water has chemically combined with underground limestone. In this case the carbonic acid free water would require treatment to remove these metals if there was a need to reuse the water in potable form, which is likely in view of the huge quantities used. This concern on water quality applies even more to the re-use of water from fracking to recover gas from shale formations, such as the Marcellus in and around Pennsylvania. This latter water issue is discussed in Zauderer's 2010 Provisional application cited above.

The methods for separating the $CO_2$ from $N_2$ and sequestering the $CO_2$ in underground geologic formations in the prior Zauderer patents cited herein will accomplish the $CO_2$ removal effectively. The methods disclosed in the present invention extend the efficiency and further reduces the cost of $CO_2$ separation and sequestration.

The FIGURE shows how the present invention is practiced. However, before describing the functions of the various steps in said FIGURE, the entire invention will first be narrated followed by presentation of the functions of each steps in the FIGURE. This should simplify the explanation as to how this Invention is to be practiced.

Separation of gas bubbles from water: A key element of this Invention is the separation of air bubbles of various sizes that are formed in water-air mixtures from water. This issue has been studied extensively experimentally and reported as early as 1903 in Germany. Results of this work have been summarized in Ludwig Prandtl's book Essentials of Fluid Mechanics (English translation, Hafner Publishing Company, NY, 1952, pages 320-330). An air bubble, and including nitrogen which is 79% by volume in air, floats upward to the surface of the water-air mixture at a rate that depends on its spherical equivalent diameter. At less than 0.16 mm, Stokes' law governs its upward motion. Above 1 mm to the 10s of mm range, Newton's law of motion governs its upward motion. For example, for droplets in the range from 3 mm to 8 mm, the upward experimentally measured velocity remains almost constant at 0.21 to 0.22 meters per second, an average 0.215 m/s, which converts to 0.705 ft/sec, or 42.3 ft/min. Prandtl cites other data for upward velocity ranging from 1 mm and above, or 12 mm or above, by the formula $v=1.28*(g*d)^{0.5}$, or $v=0.69*(g*d)^{0.5}$, respectively for the 2 sizes. Here v is the upward velocity in cm/sec, g is the acceleration of gravity=980 cm/sec$^2$, and d is the diameter of an air bubble by computing its volume as a sphere. Selecting a 1 mm bubble, the first equation yields an upward velocity of 25 ft/minute, while for a 12 mm bubble it is 46.57 ft/min. It has also been observed that the air bubbles increasingly elongate, as their size increases. Furthermore, they agglomerate as the droplets travel upward to the point where a bubble can fill the diameter of a vertical tube or pipe. These measurements were taken almost certainly in quiescent water, and they would probably be higher in stirred water. In any case, all this would be measured for the application disclosed herein of separating $N_2$ from $CO_2$-water solution, followed by separation of dissolved $CO_2$ from water. This measurement would be implemented over the entire $N_2$ and $CO_2$ droplet size ranges and pressure vessel size ranges for $N_2$ separation, and also for $CO_2$ separation from water, as disclosed herein. Also the importance of these data is that they show the gas droplets will rapidly travel to the surface, even in a large volume gas separation chamber. This will facilitate gas separation from liquids. Furthermore, these data suggest that the gas separation should take place in shallow water such as horizontal pipes or shallow pools, in order to accelerate the gas separation time. For example, a 4 ft. diameter, horizontal pipe used for gas bubble separation with a 25 ft/min upward velocity, will require less than 10 seconds to separate the $N_2$ if measurements show that gas bubbles are in the mm size range that produces this upward bubble velocity.

Application $N_2$—$CO_2$ separation to coal power plant $CO_2$ sequestration: The prior art data that shows rapid upward separation of gas droplets from water indicate that separation of $N_2$ is rapid. The prior art droplet experiments were implemented with one gas, namely air, and one liquid, mostly water. However, in the present application the objective is to first dissolve the $CO_2$ in water. Although $CO_2$ is 60 times more soluble in water than $N_2$, it is essential that dissolved $CO_2$ is not re-released in part or completely during the $N_2$ separation, which would result if the pressure in the water-$CO_2$—$N_2$ mixing vessel drops as the $N_2$ is removed. How to avoid re-evolution of $CO_2$ is herein explained by referring to the two-step process described in Zauderer's U.S. Pat. No. 7,282, 189. In said patent, in the first step $CO_2$, $N_2$, and water are compressed from 1 to 10 atmospheres, (147 psi), and the $CO_2$ is dissolved in water. Prior art states that the $CO_2$ is in a liquid state, but even if not completely liquid, $CO_2$ solubility would results in gaseous droplets in the sub-mm size subject to Stoker flow, and for the top size of this Stoker flow, namely d=0.14 mm, the upward velocity would be $v=0.4*d^2$, or 0.0047 cm/min=0.00015 ft/min, which is extremely slow. Therefore, the $CO_2$ will be dispersed in the water, and will not separate significantly from the water.

Next, the $N_2$ gas is separated from the $CO_2$-water liquid. To dissolve the 444,000 lb/hr $CO_2$ at 10 atm. and 75° F. requires 29,750,000 lb/hr of water based on measurements reported in prior art. The next step is to separate this liquid solution from the 814,000 lb/hr of $N_2$. This results in an inflow into the mixing chamber of 7,931 cu.ft./min of water, and 9,831 cu.ft./ min of $N_2$ gas. The gaseous $CO_2$ volume is 6,862 cu.ft./min, at 147 psi, and 75° F. Its density is 0.88 lb/cu.ft. But after dissolving in water, the liquid $CO_2$ density is 68.2 lb/cu.ft., and its volume in water is reduced by 77.5 times, to 88 cu/ft/min, or 88/7931=1.1% of the water volume and can be ignored. At this point, the $N_2$ gas is 55% of the combined volume of $N_2$ and dissolved $CO_2$-water solution, which totals 17,883 cu.ft./min. Now when the $N_2$ is released from the mixing chamber and expanded through a gas turbine to recover an estimated 90% of the $N_2$ compression energy, the void created in the water-$CO_2$—$N_2$ mixing chamber by removing the $N_2$ gas will cut the pressure over the water-$CO_2$ solution about one half. This will release about one-half the dissolved $CO_2$ as a gas, which would then partially mix with the withdrawn $N_2$ and reverse its separation from $CO_2$. This $CO_2$ separation would be a slow process due to the sub-mm size of any $CO_2$ gas droplets released. It would take time for these droplets to agglomerate to a size where their upward flow would be governed by Newton's law of motion, namely above about 1 mm. This problem of reversing the $CO_2$ separation was not mentioned in Zauderer's U.S. Pat. No. 7,282,189. To prevent re-evolution of the $CO_2$ from the water as the $N_2$ gas is withdrawn, use is made of the rapid vertical rise of $N_2$ gas bubbles and their agglomeration into larger bubbles. The much higher density of the water-$CO_2$ solution will sink to the lower part of the water-$CO_2$—$N_2$ mixing chamber, or horizontal pipe. By drawing the water-$CO_2$ solution out of the bottom of the mixing chamber through rotary valves, or back flow reverse flow blocking valves, the remaining $N_2$ will retain its mixing pressure, such as 147 psi in the present separation example. The $N_2$ would be removed from the top of the mixing chamber through one or more one-way valves followed by expansion through gas turbines to recover the $N_2$ compression energy, as described in U.S. Pat. No. 7,282,189.

In summary, the above steps disclosed herein for the 10 atm. example are: The water-$CO_2$—$N_2$ streams are injected into a mixing vessel, which could be a horizontal cylindrical pipe. The $CO_2$ rapidly dissolves in the water, followed by the water-$CO_2$ solution being drained though rotary or backflow prevention valves at the bottom of the mixing pipe, while $N_2$ is removed through backflow prevention valves at the top of the mixing chamber or mixing pipe. The time sequence of these events is controlled by the rate at which bubbles of $N_2$ flow upward to the ceiling of the mixing chamber because it is the slowest step in the $N_2$ separation process. The time of the $N_2$ bubble ascent must be determined for each set of process operating conditions in the present invention. From the above cited ascent rate for 1 mm and 12 mm air bubbles of 0.42 and 0.78 ft/sec, the ascent time in a 4 ft D. pipe would be 10 and 5 seconds respectively. By way of example, assuming a 4 foot diameter horizontal mixing pipe, the entire process consists of dissolving the $CO_2$ in water, removing the $CO_2$-water liquid from the bottom of the pipe, and removing the 9836 cfm of $N_2$ that enters the 4 ft. D. mixing pipe and flows out at this rate to the gas turbine. Assuming a residence time of 10 seconds to collect the $N_2$ bubbles at the top of the 4 ft. D. pipe, there will be 1640 cubic feet $N_2$ at any time in this pipe covering a 130 feet length. The transit time of $N_2$ in the 130 feet long pipe length is 10 second, which requires a 13 ft/sec velocity. An opening slot at the top of the downstream end of this pipe would only be 2 square feet to maintain the quantity of $N_2$ gas in the pipe constant.

The above example teaches how the $N_2$ separation can be implemented. Other methods can be implemented provided the steps described herein are retained. Increasing the pipe diameter would be counter productive because the bubble ascent time would increase. On the other hand, anyone who has shaken a sealed, warm carbonated soda water bottle has seen the $CO_2$ bubbles immediately rise to the top of the bottle. Also, pouring the contents from a quiescent soda bottle into a cup takes seconds for bubbles to dissipate. Therefore, vigorous mixing with, for example a horizontal helical auger placed between the floor and somewhat above the center of the horizontal 4 foot D. pipe, will accelerate the $N_2$ bubble ascent rate. Another option is to use a shallow pool several feed deep with large surface area.

The key to utilizing the $N_2$ separation process disclosed herein is to determine the rates of solution of the $CO_2$ in water, and the rate of bubble formation and flow to the top of the water-$CO_2$—$N_2$ mixing chamber over a range of pressures and temperatures suitable for implementing these processes. This can be done by the following experiment: A quantity of water equal to the amount needed to dissolve $CO_2$, at for example 75° F. and 147 psi, is used to fill the entire volume of a pressure vessel to this temperature and pressure. An amount of $CO_2$ gas equal in weight to its solubility at this water pressure and temperature is then injected into the vessel, which will increase the pressure to a higher levels, which will then decrease to the final level as the $CO_2$ dissolves, and the time taken will provide an estimate of the rate of solution. In the present example, the $CO_2$ injected would be 1/76 of the water weight. This 1.1% added final volume for solution in this example is ignored. The experiment is repeated with the $N_2$ injected at the same time as the water and $CO_2$, and the amount of each of the three is injected in quantities that equal the final ratio of water, $N_2$ gas, and $CO_2$ liquid after equilibrium is reached. The time taken to reach the final 75° F. at 147 psi will be the $CO_2$ solution time. A sample will be drawn from a tiny opening in the vessel wall just above the elevation at which only the $N_2$ gas exists, and passed through a dry ice or water-absorbing trap. The samples will be drawn at first after a time longer than the theoretical time for all the $N_2$ bubbles to reach the top of the vessel. The sampling time will be step wise reduced until water begins to condense in the trap, and this will be the $N_2$ separation time. This experiment can be implemented at all conditions of interest for $CO_2$ solution in water, and $N_2$ separation from the $CO_2$-water solution. The scale of this experiment would be implemented at increasingly larger sizes to provide data for design at power plant scales.

It is important to stress that this physical separation of $N_2$ is facilitated by the nominal 20% $CO_2$, by volume, concentration in the combustion gas exhaust that is attainable with stoichiometric air/fuel combustion in the air cooled slagging combustor, as disclosed in the Zauderer patents cited herein, that makes this $N_2$ separation much more efficient and far less costly than the chemical processes for $N_2$ separation using mostly amines or ammonia, or using only $O_2$ as being pursued by all others at this time. These other methods operate at low, 10% to 12%, $CO_2$ concentration by volume in conventional coal power plant, which would require at least double the water flow of the present invention, which doubles the gas and water pumping power. Also, in using amines, the overall power plant efficiencies are reduced by 26% and the cost of $CO_2$ separation and pumping to the sequestration site is 75% of the quoted $73/ton of $CO_2$, which equals $73/MW, for conventional coal power plants. For gas turbine power plants, the $CO_2$ concentration in the combustion gas exhaust is in the 3% to 6% range by volume, which makes physical $CO_2$ separation costly and inefficient for gas turbines. Below in this Non-Provisional application methods for improving $N_2$ separations under the latter two conditions are disclosed.

Separation of $CO_2$ Re-Evolved to a Gas from the $CO_2$-Water Solution:

The above two step $CO_2$ sequestration example taken from Zauderer's U.S. Pat. No. 7,282,189, (columns 15 and 16), compressing the $CO_2$-water solution remaining after the $N_2$ was removed to 1,000 psi, which required 37 MW, and a total of 55 MW equal to 25% of the plants gross power of 221 MW (column 16, lines 39 to 54). To reduce this in-plant power, an alternate example was disclosed consisting of 1 step from 1 atmosphere to 1,000 psi (column 17, lines 1-40). This reduced the $CO_2$-water pumping power to 5.2 MW (from 42.4 MW, namely 5.4 MW to 147 psi followed by 37 MW to 1000 psi). However, the $CO_2$ compression power before solution in water from 14.7 psi to 1,000 psi increased to 19.7 MW versus 10 MW in the two-step method. Also, the $N_2$ compression power in 1 step from 14.7 psi to 1000 psi, doubled to 59.7 MW from 23 MW in the 2 step example, although after power recovery from $N_2$ expansion, the net $N_2$ compression power increased from only 2 MW to 6 MW. The net result was that the one step method required only 31 MW, equal to 14% of the 221 MW output, versus 25% in the two step method. However, the capital cost was considerably greater due to doubling of gas compression and pumping equipment.

With the gas bubble separation option, improved efficiency and major capital cost reductions are now possible. Specifically, it is disclosed that as soon as the $CO_2$-water solution is separated from the $N_2$—$CO_2$-water mix, its pressure is dropped back to 14.7 psi, which will re-evolve over 90% of the $CO_2$ as a gas, with the same upward moving gas bubbles as with $N_2$. Here also, the time duration of this process can be tested as in the $N_2$ separation process explained above. Furthermore, the same estimated 90% of the $CO_2$ gas compression power of 10 MW can be recovered for a net loss of 1 MW. The $CO_2$ is then compressed either in two steps of 3 stages each to 147 psi, and then to 1000 psi, or in one step to 1000 psi for sequestration.

In addition to the efficiency and cost improvement, an even greater improvement is the sharp drop in water that is injected into geologic formations where it could be contaminated from leached metals if the water has to be recovered for surface use, or where there is limited water in arid regions.

Furthermore, for sequestration in limestone formations, the carbonic acid injection will proceed at higher rates in forming calcium bicarbonate, as per Zauderer's U.S. Pat. No. 7,282,189. The less water the more effective the conversion.

The power required for the two-step $CO_2$ recompressions would be:

a) $CO_2$ Step 1: 1 MW net (i.e. 10 MW compression from 14.7 psi to 147 psi minus 9 MW expansion from 147 psi to 14.7 psi), b) $CO_2$ Step 2: 18.1 MW (i.e. 10 MW from 14.7 psi to 147 psi plus 8.1 MW from 147 psi to 1000 psi), c) Water compression: 5.4 MW, from 14.7 psi to 147 psi, d) $N_2$ compression: 2 MW (i.e. 23 MW compression-21 MW expansion) from 14.7 psi to 147 psi and back to 14.7 psi.

Total power is 26.5 MW, which equals 12% of the 221 MW plant gross output.

While the internal power required is only 2% lower than the 14% in the one-step process, the equipment cost is at least 50% lower and the water needs are now minimal compared to the very large amounts in the Zauderer's U.S. Pat. No. 7,282,189 because the water is now continuously recycled and reused instead of it all being injected into the ground Alternatively, if the $CO_2$ after expansion from 147 psi to 14.7 psi is then re-compressed in 3 stages with intercooling to ambient temperatures, (as is the case in the gas compression methods taught in the present invention and U.S. Pat. No. 7,282,189) from 14.7 psi to 1000 psi, the compression power would be 19.4 MW, instead of 18.1 MW in the presently disclosed two-step $CO_2$ recompression. This is not a significant difference.

Other alternatives are to lower $N_2$ separation pressure below 147 psi and increase the water needed for dissolving the $CO_2$, or increase the pressure and lower the solubility water needed. The selection of the preferred pressure for the $N_2$ separation will depend on capital cost and water availability. In any case, a key benefit of the presently disclosed two-step process is the removal of large amounts of water from the $CO_2$ increases the concentration of carbonic acid, which will accelerate the rate of geologic limestone conversion into calcium bicarbonate for $CO_2$ sequestration. The one step method in U.S. Pat. No. 7,282,189 has only 6.7 pounds of water per pound of $CO_2$, namely 2,800,000 lb/hr per 444,000 lb/hr of $CO_2$. In the new process the injected water could be reduced to approach 1 mol of $H_2O$ per mol of $CO_2$ to form $H_2CO_3$, i.e. carbonic acid.

Another option is to rapidly stir the $CO_2$-water solution to drive off the $CO_2$ while maintaining the water and $CO_2$ pressure as close as 147 psi as possible.

Another option would be to use the gas temperature exhaust from the 212 MW power plants, which is usually in the 300° F. range, to heat the 75° F., 147 psi, $CO_2$-water solution from 75° F. to 280° F. and drive off 85% of the $CO_2$. The water would then be cooled by river water back to 75° F. This would require heat exchangers for heat-up and for cooling.

In summary, the benefits of the present two-step method are lower compressor capacity and lower capital equipment costs, and much lower water injected into underground formations. The primary benefits are: a) The high $CO_2$ concentration of 20%, which enables physical separation of $N_2$ with reduced amounts of water, b) the upward motion of $N_2$ bubbles that enables their rapid separation from the $CO_2$—$H_2O$ solution, and c) followed by $CO_2$ bubble separation from the water in the $CO_2$-water solution. All this is accomplished without chemical separation, such as with amines, or with $O_2$ firing, both of which are very costly and sharply lower the power plant efficiency.

Powering the Gas Compressors:

Although much lower than the power consumed in chemical separation of $CO_2$, the physical $CO_2$ separation processes in Zauderer's patents and Provisional applications including the present one still consume 12% of the plant's power output. Since the primary application is retrofit to existing coal power plants, most of the capital equipment is in place, and the primary cost is that of the fuel for the $CO_2$ removal. Zauderer's US patents address this by using the air-cooled slagging combustor fired with minimal cost waste fuels, namely carbon content fly ash, anthracite culm, municipal refuse derived fuels, coal mine waste. These fuels, consisting almost totally carbon yield 20% $CO_2$ in the exhaust, which facilitates the $CO_2$ separation and sequestration processes.

In addition, there is another important benefit of physical $CO_2$ separation, in that the power to drive the gas compressors and water pumps can be supplied from excess capacity in most current power plants, which operate below their rated capacity.

According to the U.S. Energy Information Administration/Department of Energy (EIA/DOE) the US Nameplate coal power capacity is 337,000 MW and the actual operating capacity is about 313,000 MW, meaning that 7% of capacity is unused. The reported annual output for 2007 and 2008, was about 2 billion MWH from an average 6,400 hours of operation per year, which equals 73% of the 8760 hours per year.

The large 1000 MW range plants operate at 80% or 7,000 hrs per year, while the smaller plants, below about 300 MW operate below the average period.

Now in the two-step $CO_2$ removal process disclosed herein, 12% of the power output is used to remove the $N_2$ from the $CO_2$ and pressurize it for injection into geologic formations, primarily limestone with is widely distributed in the US. Saline formations, abandoned coalmines, can also be used, but are less desirable as explained in Zauderer's U.S. Pat. No. 7,282,189.

Now 12% of 2 Billion MWH equals 240 Million MWH. Using the 7% unused coal power capacity below nameplate, with 6400 hours of operation would provide 7/12*240MMWH=140MMWH power to drive the compressors and pumps. They could be driven by the coal plant's steam turbines.

Zauderer's U.S. Pat. No. 7,282,189 discloses pyrolysis of the coal's volatile matter into hydrogen, or methane. These gases can be used to power gas turbines. According to EIA in 2008 US gas turbine power output was 806 Million MWH, from 446,000 MW nameplate capacity, and 427,000 MW winter operating capacity and summer somewhat lower. This yields only 1900 annual hours of operation, which is only 33% per year. Therefore, there is excess compressor power from existing gas turbines. In fact the said patent discloses that $H_2$ or natural gas derived from coal volatile matter can double the capacity of a coal plant that can be supplied by the unused capacity of existing gas turbines. In the example used in this invention and in the example from the said patent, the output of a nominal 100 MW coal power plant is doubled to 221 MW by the gas turbines.

In conclusion, there is sufficient existing excess capacity from coal fired steam power and natural gas fired turbine power to power the $CO_2$ separation and sequestration with the process disclosed in the cited Zauderer patents and provisional applications.

Modifying Operation of Existing Coal Power Plants for $CO_2$ Separation and Sequestration Zauderer's U.S. Pat. No. 7,282,189, U.S. Pat. No. 7,435,400 and U.S. Pat. No. 7,553,463 disclose retrofitting the coal burners in existing coal fired power plant boilers with air-cooled slagging combustors and operating them under conditions that yield about 20% $CO_2$ by volume in the exhaust, namely at stoichiometric fuel/air ratios, SR, of unity. SR=1 facilitates physical separation of $CO_2$ from the balance gas, $N_2$. As stated there and herein, this is double the $CO_2$ concentration in all regular coal fired boilers, whose low $CO_2$ concentrations of 10% to 12% by volume require costly $73/ton of $CO_2$ chemical separation primarily with amines.

Surprisingly, the 10%-12% values have been accepted as axiomatic without any explanation as to their cause. A simple combustion program can calculate the wet (with $H_2O$ vapor) and dry (with $H_2O$ vapor condensed out) $CO_2$ and $N_2$. For $CO_2$ separation, the dry case provides the highest $CO_2$ concentration and it should be used. The following are a set of simple thermodynamic equilibrium calculations for several coals and for natural gas, which indicate that SR=1 should be used to practice Zauderer's patents and Provisional applications on existing cola power boilers and furnaces.

Anthracite culm, which consists solely of carbon as a fuel, has $CO_2$ at SR=1, (dry)−20.9%, which is the highest value attainable with burning a pure carbon fuel in atmospheric air.

A Pennsylvania coal was selected as representative of Bituminous coals. For SR=1, $CO_2$ (dry)=18.23%, (wet)=16.96%. For SR=1.15, which is the general level of excess air used in current coal fired boilers, $CO_2$ (dry)=16.49%, (wet)=14.78%. To reach the 12% $CO_2$ reported in current coal boilers requires SR=1.5, (namely major excess air), $CO_2$ (dry)=12%, (wet)=11.5%. To reach 10% $CO_2$ requires SR=1.7 (massive excess air), $CO_2$ (dry)=10.6%, (wet)=10.16%.

Now part of this high excess could be due to the industry wide operation of fuel rich, low $NO_x$ burners that require excess air in the furnace, which could be high in order to achieve mixing and oxidize the CO, especially in the towering nominally 10 story high, 1000 MW boilers. However, a more plausible explanation is air infiltration. The boilers must operate under negative draft to prevent spreading CO all over the power plant and endanger personnel. Also, their large size, especially when they operate on major daily output swings causes repeated load swings dictated by the electric grid operator, inevitably will lead to cracks in the boiler walls. Fixing these leaks would be expensive and probably useless if the boilers are subjected to repeated thermal wall stress from load swings.

It is therefore disclosed now to operate the boilers at SR=1, which will eliminate CO and eliminate the need for negative draft. The resultant high $NO_x$ could be controlled by post-combustion methods disclosed in Zauderer's U.S. Pat. No. 7,435,400 and Zauderer's US $NO_x$ control patents. Furthermore, the boiler should not be subject to regular load swings, which will inevitably stress the boiler walls and lead to air infiltration through cracks. Of course retrofitting the boilers with the air-cooled, slagging combustors will also address the other air and solid emission issues facing existing coal fired boilers, as taught in Zauderer's patents.

The same issues apply to boilers fired with other coals, such a Wyoming Sub-bituminous. At SR=1, $CO_2$ (dry)=19.0%, (wet)=16.77%.

In any case, operating at SR=1 with no air infiltration, which allows $CO_2$ emission removal as per Zauderer methods, will be far lower in cost than $CO_2$ removal with amines in existing boilers.

The $CO_2$ removal problem with natural gas fired turbines is far worse. The industry prides itself that $CO_2$ emissions are one half of coal, and somewhat less than that due to higher efficiency of combined cycle plants than steam plants. Overlooked is that the $CO_2$ emissions will be higher by 50% from coal plants with total $CO_2$ removal as per the Zauderer patents and provisional applications. The relevant numbers are for SR=1, the $CO_2$ (dry)=11.67%, (wet)=9.46%. DOE reports state that the $CO_2$ out of the stack ranges from 3% to 6%. To reach 6%, SR=1.5 is needed, with $CO_2$ (dry)=7.49%, (wet)=6.52%. To reach 3%, which applies to most gas turbines, requires very high excess air, SR=3, yielding $CO_2$ (dry)=3.61%, (wet)=3.37%. There is no explanation as to reason for these huge excess air levels. It is not due to combustion inefficiencies because natural gas burns efficiently, even under fuel rich $NO_x$ control combustion. The answer is almost certainly due to the high airflow needed to cool the gas turbine blades with countless tiny holes to allow cooling air entry, which will dilute the $CO_2$ concentration in the turbine exhaust.

Therefore, to practice this invention and use bubble separation to first remove nitrogen gas bubbles from the carbon dioxide-water solutions, followed by removing carbon dioxide gas bubbles from the carbon-dioxide-water solution, the combustion of the solid, liquid, or gaseous fuels should be implemented at stoichiometric ratios of unity, and the pollutants, such as $NO_x$ should be removed upstream of the $N_2$ and $CO_2$ separation steps, as well as all water vapor, in order to minimize the ratio of water necessary to dissolve $CO_2$ in water and thereby implement the $N_2$ separation as gas bubbles, followed by separation of $CO_2$ gas bubbles from water. These steps are implemented at elevated pressures, such as 10 atmospheres, which increases the $CO_2$ solubility by Henry's Law. The separated $N_2$ is released to the atmosphere after recovering its initial compression power. The $CO_2$ is separated preferably by returning the compressed $CO_2$-water solution to atmospheric pressure, followed by compression of the $CO_2$ gas to pressures suitable for geologic sequestration of $CO_2$, preferably in geologic limestone formations to form calcium bicarbonate.

To achieve complete combustion at SR=1, coal fired boilers should replace the coal burners with air-cooled slagging combustors. All boiler or furnace air infiltration leaks should be sealed, irrespective of the fuel burners used.

For gas turbines, $CO_2$ gas cooling of combustor walls and turbine blades should be used to retain SR of unity at the turbine exhaust.

In conclusion, the $CO_2$ removal and sequestration methods disclosed in Zauderer's patents and this application are far cheaper and could be implemented on a large scale almost immediately.

FIGURE: Schematic Drawing of the Invention

The following identifies the numbers and their function in the FIGURE, which summarizes the above narrative description as to how to practice this invention.

Reference numeral 1 is the post-primary combustion part of a coal, oil, or gas fired boiler or furnace. Reference numeral 2 identifies this region as the location where pollutants, especially $NO_x$ and $SO_2$, are removed by the inventor's patents as cited above, in order to prevent or at least limit their presence in the water and sequestered $CO_2$.

Reference numeral 3 is the location of the boiler exhaust ducting immediately upstream of the location of the ESP or baghouse. Here the gases are cooled to near ambient conditions in order to condense and drain all the moisture 5, prior to entry of the $N_2$ and $CO_2$ into the 3-stage-compressor 4, with intercooling for compression to a nominal 10 atm, followed by their injection into the flow separator, or several 100 feet long, 4 foot diameter pipe 7, into which is injected recycled water recovered from separation of the $CO_2$ from the $CO_2$-water solution in vessel 23, and recompressed to the same water pressure, for example 10 atm, as the $CO_2$ and $NO_x$, and in said vessel 7, $N_2$ gas bubbles 8, float to the top of the vessel and are removed through one-way valve, Item 11, into a pipe, Item 20, to flow through a gas turbine 13, to atmospheric pressure and exit a stack 25 to the atmosphere.

Simultaneously, the $CO_2$-water solution in removed through one-way valve 10 through pipe 12 into the $CO_2$-water separation vessel 23, whose pressure decreases causing $CO_2$ bubbles 17 to evolve and flow through a one-way valve 14 to a gas turbine Item 16 which recovers almost all the original $CO_2$ compression power that was used to compress the $CO_2$ leaving the boiler Item 3. As noted, the $N_2$ compression power in gas compressor Item 4 was mostly recovered by $N_2$ expansion in the gas turbine 13.

After exiting turbine 16 at ambient atmospheric pressure, the $CO_2$ gas is re-compressed in a multi-stage compressor 18 in one or two steps to 1000 psi, where it is mixed with water drawn from vessel 23 and flows through value 19 to be compressed to the same above 1000 psi by a pump, item 24 and injected into pipe 21 that is installed down to over 2150 feet in order to form carbonic acid to react with underground limestone formation to form calcium bi-carbonate for permanent underground $CO_2$ sequestration. Item 6 is a value, item 17 are bubbles within the vessel 23 and item 22 is a water pump.

While the invention has been described in terms of certain exemplary embodiments, those skilled in the art will recognize that the invention can be practiced with modifications within the spirit and scope of the appended claims.

I claim the following:

1. A method comprising:
   physically removing all carbon dioxide from combustion products of solid, liquid, and gaseous fossil fuels in power plants that contain components, including one or more of furnaces, boilers, gas turbines, and heat engine by:
   condensing water vapor formed by combustion and compressing the carbon dioxide, nitrogen, and the water to a same pressure;
   followed by dissolving the carbon dioxide from combustion in water to form carbonic acid;
   followed by separating nitrogen gas from the dissolved carbon dioxide;
   followed by re-evolving the carbon dioxide from the water solution; and
   followed by mixing the carbon dioxide in water;
   recompressing the carbon dioxide with water mixture to pressures high enough to form carbonic acid; and
   injecting the carbonic acid into underground limestone formations resulting in permanent sequestration as calcium bicarbonate.

2. The method of claim 1, further comprising operating combustors at a stoichiometric ratio of unity in order to maximize carbon dioxide concentration in products of combustion under conditions where excess air by infiltration through furnace or boiler walls is eliminated by closing wall openings, and in case of gas turbines excess air is eliminated by using blade cooling with carbon dioxide instead of air.

3. The method of claim 1, wherein the fossil fuel is coal, pollutants comprising nitrogen oxides, sulfur dioxide, hydrogen chlorides, dioxins, furans and volatile trace metals are removed in combustion and post combustion zones, by using air-cooled slagging combustors in the combustion zone, and- in the post combustion zone.

4. The method of claim 3, wherein exhaust gases consisting of carbon dioxide, nitrogen, and water vapor, are cooled to ambient air pressure and temperature in order to condense the water vapor formed by the combustion.

5. The method of claim 4, wherein, the compressing the carbon dioxide, nitrogen, and the water to the same pressure in order to dissolve all the carbon dioxide in the water, the pressure is selected so that compression power consumes a fraction of a total plant power, and with the gas and water compression power provided by compressors and pumps driven by excess steam turbine capacity not used to drive a generator.

6. The method of claim 5, wherein, after the gases and water are processed, the compressed carbon dioxide, nitrogen, and water are injected into a mixing chamber or horizontal pipe having a height and volume to enable insoluble nitrogen gas bubbles to float to a top of the mixing chamber or horizontal pipe where the volume is large enough to maintain a constant pressure in the mixing chamber while removing the nitrogen gas collecting at the top of the horizontal pipe or mixing chamber through one or more one-way valves and used to drive gas turbines that recover almost all of the nitrogen compression power.

7. The method of claim 6, wherein during removal of the nitrogen gas, the pressurized carbon dioxide-water solution is simultaneously drained from a lower part of the mixing chamber through one or more one-way valves into a lower chamber or pipe at a same rate as the nitrogen is removed at the top of the mixing chamber.

8. The method of claim 7, wherein the pressure in the lower chamber is reduced in order to re-evolve the carbon dioxide from the solution as gas bubbles that are directed through one-way valves to gas turbines in order to recover most of the carbon dioxide compression power as the gas pressure is reduced to one atmosphere.

9. The method of claim 8, wherein the carbon dioxide is re-pressurized in one or two steps to 1000 psi that is sufficient to inject the gas into about 2150 feet deep geologic limestone formations while being mixed with sufficient water to form the carbonic acid that reacts with the limestone to form the calcium bicarbonate that permanently sequesters the carbon dioxide.

10. The method of claim 8, wherein the water recovered from the lower carbon dioxide-water solution chamber is reused by re-pressurization to repeat the carbon dioxide removal processes with new carbon dioxide and nitrogen from the fossil fuel combustion products, which results in continued use of much of the water and eliminates or reduces a possibility of the water becoming contaminated from leached underground materials, including hazardous trace metals and other underground contaminants.

11. The method of claim 1, further comprising separating $N_2$ as gas bubbles from water and the $CO_2$ dissolved in water as carbonic acid, followed with separating $CO_2$ as gas bubbles from the water, and compressing the $CO_2$ gas with water to form the carbonic acid and permanently sequestering it in the underground limestone.

* * * * *